US011948511B2

(12) United States Patent
Zhou et al.

(10) Patent No.: US 11,948,511 B2
(45) Date of Patent: Apr. 2, 2024

(54) PIXEL DRIVING CIRCUIT AND DISPLAY PANEL

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/090,534

(22) Filed: Dec. 29, 2022

(65) Prior Publication Data

US 2023/0351961 A1 Nov. 2, 2023

(30) Foreign Application Priority Data

Apr. 29, 2022 (CN) ......................... 202210466137.0

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0842* (2013.01); *G09G 2330/021* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 9,741,283 | B2 * | 8/2017 | Lee | G09G 3/006 |
| 2016/0307503 | A1 * | 10/2016 | Song | G09G 3/3233 |
| 2019/0005881 | A1 * | 1/2019 | Yue | G09G 3/3208 |
| 2019/0043422 | A1 * | 2/2019 | Lu | G09G 3/3233 |
| 2020/0152101 | A1 * | 5/2020 | Li | G09G 3/3233 |
| 2021/0201780 | A1 * | 7/2021 | Xu | G09G 3/006 |
| 2021/0335232 | A1 * | 10/2021 | Jiang | G09G 3/3233 |

FOREIGN PATENT DOCUMENTS

| | | | |
|---|---|---|---|
| CN | 202405740 | U | 8/2012 |
| CN | 104200776 | A | 12/2014 |
| CN | 105741777 | A | 7/2016 |

(Continued)

OTHER PUBLICATIONS

International Search Report, International Application No. PCT/CN2022/137321, dated Mar. 3, 2023 (16 pages).

(Continued)

*Primary Examiner* — Dorothy Harris

(57) ABSTRACT

A pixel driving circuit includes: a switching transistor, an energy storage capacitor, and a driving transistor. The data voltage is charged to the energy storage capacitor when the switching transistor is conducted. When the switching transistor is switched off, the energy storage capacitor discharges to the driving transistor, allowing the driving transistor to output a driving current to the light-emitting unit to drive the light-emitting unit to emit light. The control module is connected in series with the driving transistor. In a process of the driving transistor outputting the driving current to the light-emitting unit, the control module detects a value of the driving current and is disconnected when the value of the driving current exceeds a preset current range.

17 Claims, 10 Drawing Sheets

(56) References Cited

FOREIGN PATENT DOCUMENTS

| | | | |
|---|---|---|---|
| CN | 109313876 | A | 2/2019 |
| CN | 111128076 | A | 5/2020 |
| CN | 111312173 | A | 6/2020 |
| CN | 210956116 | U | 7/2020 |
| CN | 113035127 | A | 6/2021 |
| CN | 114005409 | A | 2/2022 |
| CN | 114783381 | A | 7/2022 |
| WO | 2018126748 | A1 | 7/2018 |

OTHER PUBLICATIONS

Chinese First Office Action, Chinese Application No. 202210466137.0, dated Apr. 28, 2023 (17 pages).

* cited by examiner

PIXEL DRIVING CIRCUIT AND DISPLAY PANEL

CROSS REFERENCE TO RELATED APPLICATIONS

The present application claims the priority of the Chinese patent application No. 202210466137.0, filed on Apr. 29, 2022, and the entire contents of which are hereby incorporated by reference in their entireties.

TECHNICAL FIELD

The present disclosure relates to the field of displaying, and in particular to a pixel driving circuit and a display panel.

BACKGROUND

Organic light-emitting diode (OLED) display panels include an active-matrix organic light-emitting diode (AMOLED) display panel and a passive-matrix organic light-emitting diode (PMOLED) display panel. The AMOLED display panel is a display panel in which each light-emitting unit is connected to a pixel driving circuit. The pixel driving circuit is configured to drive the light-emitting unit to emit light.

In the art, the pixel driving circuit usually includes a switching transistor, a driving transistor, an energy storage capacitor. When the switching transistor is conducted, a data voltage is stored in the energy storage capacitor through the switching transistor. When the switching transistor is switched off, the energy storage capacitor discharges to a control pole of the driving transistor, enabling the driving transistor to be conducted. When the driving transistor is conducted, the driving transistor outputs a driving current to the light-emitting unit to drive the light-emitting unit to emit light.

Of course, when the driving current, which is output from the driving transistor to the light-emitting unit, is excessively high, the light-emitting unit may be damaged.

SUMMARY OF THE DISCLOSURE

The present disclosure provides a pixel driving circuit, aiming to the solve the technical problem that the light-emitting unit may be damaged due to the driving current, which is output from the driving transistor to the light-emitting unit, being excessively high. Technical solutions are as follows.

According to a first aspect, a pixel driving circuit is provided and includes: a switching transistor, an energy storage capacitor, and a driving transistor.

A first pole of the switching transistor is configured to allow a data voltage to be input to the switching transistor, a second pole of the switching transistor is connected to the energy storage capacitor; a first pole of the driving transistor is configured to allow a power supply voltage to be input to the driving transistor, a second pole of the driving transistor is connected to a light-emitting unit, a control pole of the driving transistor is connected to the energy storage capacitor; and when the energy storage capacitor discharges to the control pole of the driving transistor, the driving transistor outputs a driving current to the light-emitting unit.

The pixel driving circuit further includes a control module. The control module is connected in series with the driving transistor, the control module has a detection end, the detection end of the control module is connected to the light-emitting unit to detect a value of the driving current. When the value of the driving current exceeds a preset current range, the control module is disconnected to allow the driving transistor to stop outputting the driving current to the light-emitting unit.

According to a second aspect, a display panel is provided and includes a light-emitting unit and the pixel driving circuit according to any embodiments of the above aspect.

The second pole of the driving transistor is connected to the light-emitting unit; and when the energy storage capacitor discharges to the control pole of the driving transistor, the driving transistor outputs the driving current to the light-emitting unit.

BRIEF DESCRIPTION OF THE DRAWINGS

In order to more clearly illustrate technical solutions of embodiments of the present disclosure, the accompanying drawings for the embodiments will be briefly described in the following. Obviously, the drawings in the following show only some of the embodiments of the present disclosure. Any ordinary skilled person in the art may obtain other drawings based on these drawings without any creative work.

Figure 1:
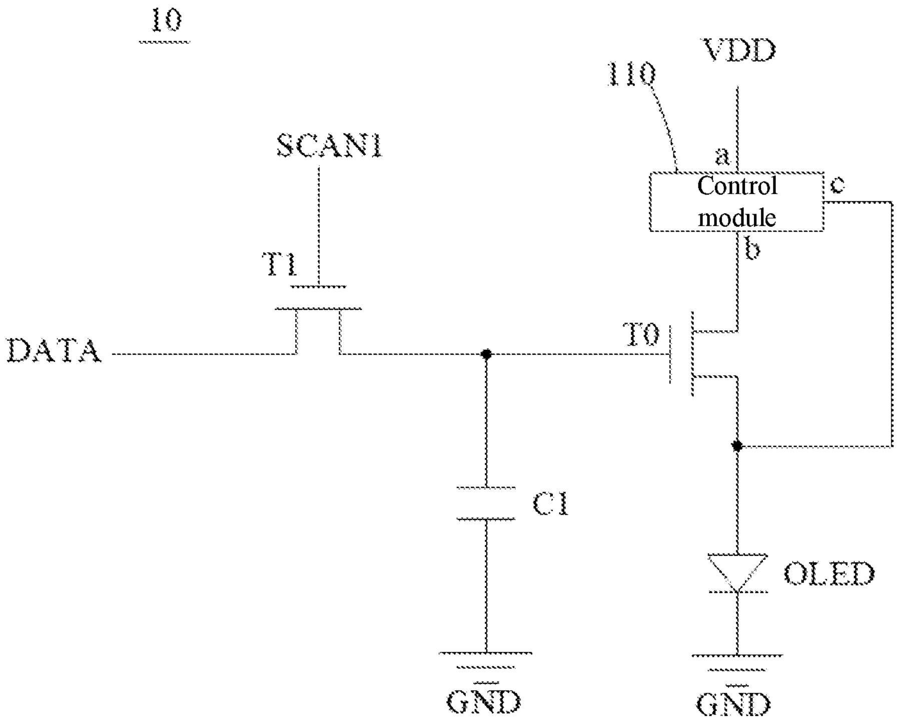
FIG. 1 is a structural schematic view of a first pixel driving circuit according to an embodiment I of the present disclosure.

Reference numerals in each drawing are as follows:

10, pixel driving circuit.

110, control module.

112, switching unit.

114, first voltage comparison unit.

116, control unit.

118, second voltage comparison unit.

SUMMARY OF THE DISCLOSURE

In order to make the object, technical solutions and advantages of the present disclosure to be clearer, the embodiments of the present disclosure will be described in further details by referring to the accompanying drawings.

It shall be understood that the term "a plurality of" in the present disclosure refers to two or more. In the description of the present disclosure, unless otherwise stated, "I" refers to "or". For example, "A/B" indicates either A or B. The term "and/or" in the present disclosure refers to an association of related objects, indicating that three relationships. For example, "A and/or B" means: A alone, both A and B, and B alone. In addition, in order to describe the technical solutions of the present disclosure clearly, the term "first" and "second" are used to distinguish identical or similar items that have substantially the same function and role. It will be understood by any ordinary skilled person in the art that the terms "first" and "second" do not limit the number of items or an order of execution, and the terms "first" and "second" do not require the defined items to be different from each other.

Embodiment I

The pixel driving circuit 10 is configured to drive a light-emitting unit to emit light. The light-emitting unit may be a light-emitting diode (LED) unit, or an OLED unit, a micro-LED unit or a mini-LED unit. FIG. 1 is a structural schematic view of a first pixel driving circuit according to an embodiment I of the present disclosure. As shown in FIG. 1, the light-emitting unit is the OLED unit (hereinafter referred to as a light-emitting unit OLED). As shown in FIG. 1, the pixel driving circuit 10 includes a switching transistor T1, an energy storage capacitor C1, a driving transistor T0, and a control module 110.

In detail, the switching transistor T1 has a control pole, a first pole and a second pole. The control pole of the switching transistor T1 is configured to input a first scan signal SCAN1. When the control pole of the switching transistor T1 inputs the first scan signal SCAN1, the first pole and the second pole of the switching transistor T1 are conducted with each other, i.e., the switching transistor T1 is conducted. On the other way, when the control pole of the switching transistor T1 does not input the first scan signal SCAN1, the switching transistor T1 is switched off. The first pole of the switching transistor T1 is an input pole and is configured to allow the data voltage DATA to be input. The second pole of the switching transistor T1 is an output pole and is connected to the energy storage capacitor C1. In this way, when the switching transistor T1 is conducted, the data voltage DATA may be charged to the energy storage capacitor C1 through the switching transistor T1. In some embodiments, as shown in FIG. 1, the energy storage capacitor C1 has a first pole plate and a second pole plate. The first pole plate of the energy storage capacitor C1 is connected to the second pole of the switching transistor T1, and the second pole plate of the energy storage capacitor C1 is connected to the ground GND.

The driving transistor T0 also has a control pole, a first pole and a second pole. The control pole of the driving transistor T0 is connected to the energy storage capacitor C1. For example, the control pole of the driving transistor T0 may be connected to the first pole plate of the energy storage capacitor C1. In this way, when the energy storage capacitor C1 discharges to the control pole of the driving transistor T0, the first pole and the second pole of the driving transistor T0 may be conducted with each other, i.e., the driving transistor T0 is conducted. On the other way, when the energy storage capacitor C1 is not discharged to the control pole of the driving transistor T0, the driving transistor T0 is switched off. The first pole of the driving transistor T0 is an input pole and is configured to allow a power supply voltage VDD to be input. The second pole of the driving transistor T0 is an output pole and is connected to the light-emitting unit OLED. In this way, when the energy storage capacitor C1 discharges to the control pole of the driving transistor T0, the driving transistor T0 may output a driving current to the light-emitting unit OLED to drive the light-emitting unit OLED to emit light. Generally, a value of the driving current is related to an amount of power, which is charged to the energy storage capacitor C1 from the data voltage DATA. In some embodiments, as shown in FIG. 1, the light-emitting unit OLED has an anode and a cathode. The anode of the light-emitting unit OLED is connected to the second pole of the driving transistor T0, and the cathode of the light-emitting unit OLED is connected to the ground GND.

The control module 110 is connected in series with the driving transistor T0. In this way, when the control module 110 is conducted, and the energy storage capacitor C1 discharges to the control pole of the driving transistor T0, the driving transistor T0 may output the driving current to the light-emitting unit OLED. On the other way, when the control module 110 is switched off and/or the energy storage capacitor C1 does not discharge to the control pole of the driving transistor T0, the driving transistor T0 stops outputting the driving current to the light-emitting unit OLED. The control module 110 also has a detection end c. The detection end c of the control module 110 is connected to the light-emitting unit OLED to detect the value of the driving current output from the driving transistor T0 to the light-emitting unit OLED. Generally, the control module 110 may have a preset current range. The control module 110 is disconnected when the value of the driving current detected by the detection end c exceeds the preset current range, such that the driving transistor T0 stops outputting the driving current to the light-emitting unit OLED. In other words, in the present embodiment, while the driving transistor T0 is outputting the driving current to the light-emitting unit OLED, the control module 110 can detect the value of the driving current and may be disconnected when the value of the driving current exceeds the preset current range. In this way, the driving transistor T0 cannot output the driving current to the light-emitting unit OLED. In this way, the value of the driving current output from the driving transistor T0 to the light-emitting unit OLED may be limited within the preset current range, such that the light-emitting unit OLED is protected.

A specific implementation of the "control module 110 connected in series with the driving transistor T0" will be explained in detail below.

In addition to the detection end c, the control module 110 further has a first end a and a second end b. The control module 110 being conducted means that the first end a and the second end b of the control module 110 are conducted with each other. The control module 110 being disconnected means that the first end a and the second end b of the control module 110 are not conducted with each other. In some embodiments, as shown in FIG. 1, the first terminal a of the control module 110 is configured to allow the power supply voltage VDD to be input, and the second terminal b of the control module 110 is connected to the first pole of the driving transistor T0. In this way, when the control module 110 is conducted, the first pole of the driving transistor T0 may obtain the power supply voltage VDD through the control module 110. In this case, when the energy storage capacitor C1 discharges to the control pole of the driving transistor T0, the driving transistor T0 may output the driving current to the light-emitting unit OLED. On the other way, when the control module 110 is disconnected, the first pole of the driving transistor T0 cannot obtain the power supply voltage VDD through the control module 110. In this case, the driving transistor T0 cannot output the driving current to the light-emitting unit OLED.

Figure 2:
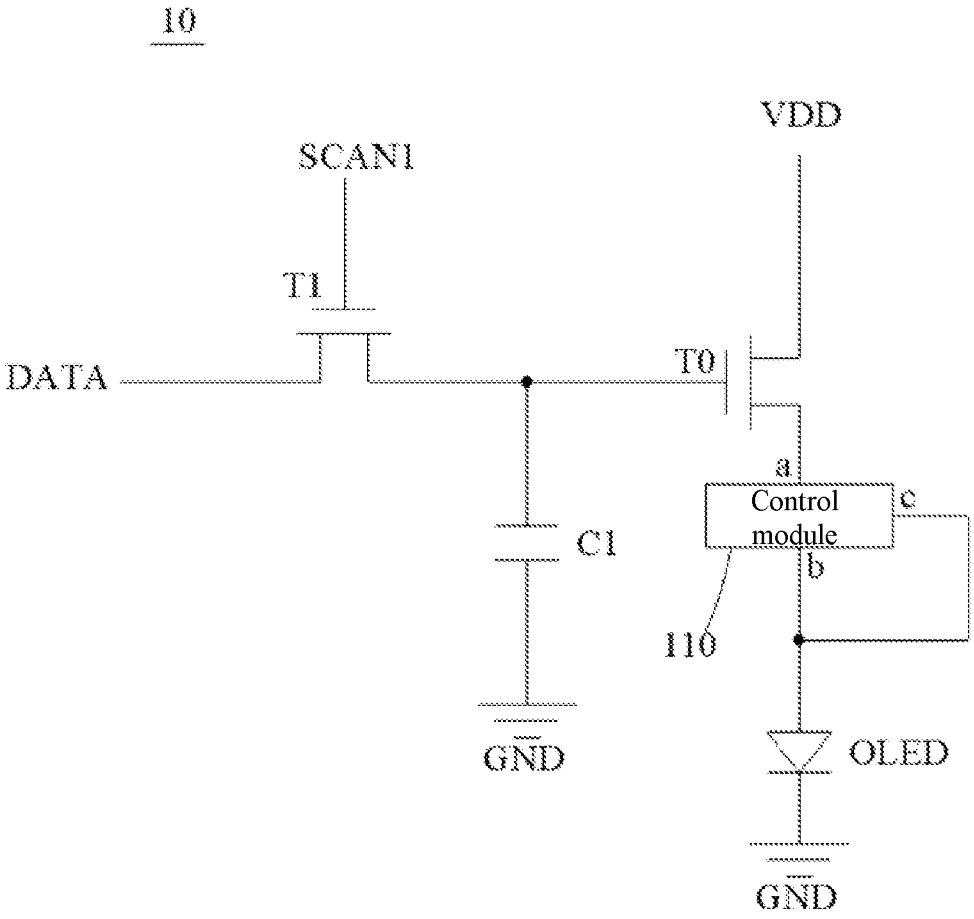
FIG. 2 is a structural schematic view of a second pixel driving circuit according to the embodiment I of the present disclosure.

In some embodiments, as shown in FIG. 2, the first end a of the control module 110 is connected to the second pole of the driving transistor T0, and the second end b of the control module 110 is connected to the light-emitting unit OLED. In this way, when the control module 110 is conducted, a conductive path is generated between the driving transistor T0 and the light-emitting unit OLED. In this case, when the energy storage capacitor C1 discharges to the control pole of the driving transistor T0, the driving transistor T0 may output the driving current to the light-emitting unit OLED. On the other way, when the control module 110 is disconnected, the conductive path cannot be generated between the driving transistor T0 and the light-emitting unit OLED. In this case, the driving transistor T0 cannot output the driving current to the light-emitting unit OLED.

Figure 3:
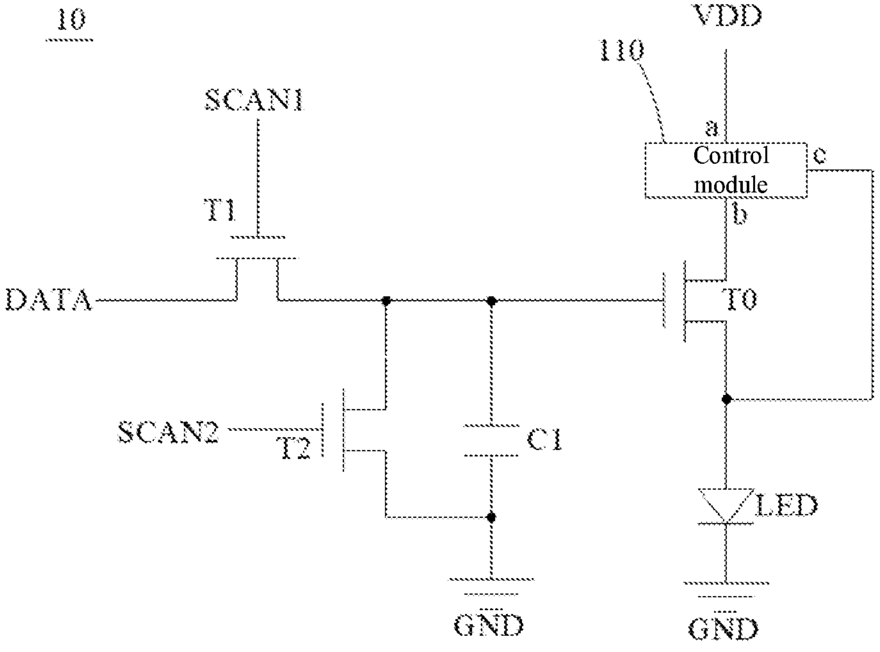
FIG. 3 is a structural schematic view of a third pixel driving circuit according to the embodiment I of the present disclosure.

To be noted that, in the above embodiments, except the control module 110, the switching transistor T1, the energy storage capacitor C1, and the driving transistor T0 cooperatively form a 2T1C circuit is a simplest circuit configured to drive the light-emitting unit OLED. Based on the above circuit, the pixel driving circuit 10 may further include more transistors and capacitors to form a 3T1C circuit, a 5T2C circuit or an 8T2C circuit, and so on. For example, FIG. 3 is a structural schematic view of a third pixel driving circuit according to the embodiment I of the present disclosure. As shown in FIG. 3, based on the 2T1C circuit, the pixel driving circuit 10 may further include a discharging transistor T2.

Figure 4:
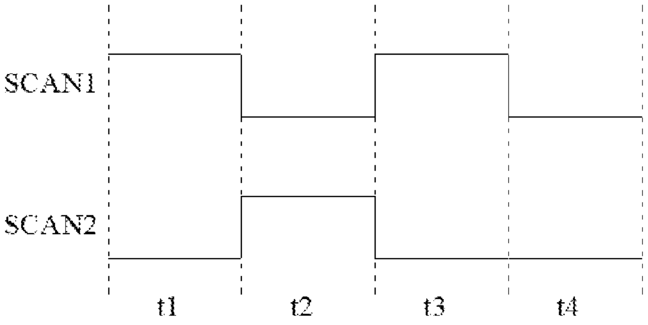
FIG. 4 is a chronological diagram of controlling the pixel driving circuit according to the embodiment I of the present disclosure.

FIG. 4 is a chronological diagram of controlling the pixel driving circuit according to the embodiment I of the present disclosure. The chronological control may be applied to the pixel driving circuit 10 shown in FIG. 3. As shown in FIG. 4, an operating process of the pixel driving circuit 10 is as follows.

In an operation S1 within a first time period, the first scan signal SCAN1 is output to the control pole of the switching transistor T1 to control the switching transistor T1 to be conducted.

Each of the switching transistor T1 and the discharging transistor T2 may be an N-type transistor being conducted under a high voltage level. Within the first time period, the first scan signal SCAN1 is input to the control pole of the switching transistor T1. At this moment, the first scan signal SCAN1 is at the high voltage level, and a second scan signal SCAN2 is at a low voltage level, such that the switching transistor T1 is controlled to be conducted, and the discharging transistor T2 is switched off. In this way, the energy storage capacitor C1 may be charged through the switching transistor T1 within the first time period.

In an operation S2, within a second time period, outputting the first scan signal SCAN1 is stopped to control the switching transistor T1 to be switched off, and the second scan signal SCAN2 is output to the control pole of the discharging transistor T2 to control the discharging transistor T2 to be conducted.

Within the second time period, the second scan signal SCAN2 is input to the control pole of the discharging transistor T2. At this moment, the second scan signal SCAN2 is at the high voltage level, and the first scan signal SCAN1 is at the low voltage level, such that the switching transistor T1 is controlled to be switched off, and the discharging transistor T2 is conducted. In this way, the energy storage capacitor C1 is discharged to the ground through the discharging transistor T2 within the second time period. After the second time period, a voltage of the energy storage capacitor C1 is equal to a threshold voltage of the discharging transistor T2.

In an operation S3, during a third time period, outputting the second scan signal SCAN2 is stopped to control the discharging transistor T2 to be switched off, and the first scan signal SCAN1 is output to the control pole of the switching transistor T1 to control the switching transistor T1 to be conducted.

In the third time period, the first scan signal SCAN1 is input to the control pole of the switching transistor T1. At this moment, the first scan signal SCAN1 is at the high voltage level, and the second scan signal SCAN2 is at the low voltage level, such that the switching transistor T1 is controlled to be conducted, the discharging transistor T2 is switched off. In this way, the energy storage capacitor C1 may be charged again through the switching transistor T1, within the third time period. After the third time period, the voltage of the storage capacitor C1 is equal to a sum of the threshold voltage of the discharging transistor T2 and the data voltage DATA.

In an operation S4, within a fourth time period, outputting the first scan signal SCAN1 is stopped to control the switching transistor T1 to be switched off.

Within the fourth time period, each of the first scan signal SCAN1 and the second scan signal SCAN2 is at the low voltage level, such that the switching transistor T1 and the discharging transistor T2 are controlled to be switched off. At this moment, the energy storage capacitor C1 discharges to the driving transistor T0, and the driving transistor T0 is conducted and outputs the driving current to the light-emitting unit OLED. In this way, by performing the operations S1 and S2, an influence in the driving current output by the driving transistor T0 caused by the threshold voltage of the driving transistor T0 may be reduced, such that brightness of the light-emitting unit OLED may be improved.

In the above operation S4, when the driving transistor T0 outputs the driving current to the light-emitting unit OLED, the control module 110 may detect the value of the driving current and may be disconnected when the value of the driving current exceeds the preset current range, allowing the driving transistor T0 to stop outputting the driving current to the light-emitting unit OLED. In this way, the value of the driving current, which is output by the driving transistor T0 to the light-emitting unit OLED, may be limited within the preset current range, such that the light-emitting unit OLED may be protected.

A specific implementation of the control module 110 will be explained in detail below.

In a first implementation, the preset current range is not greater than a maximum current value.

Embodiment II

Figure 5:
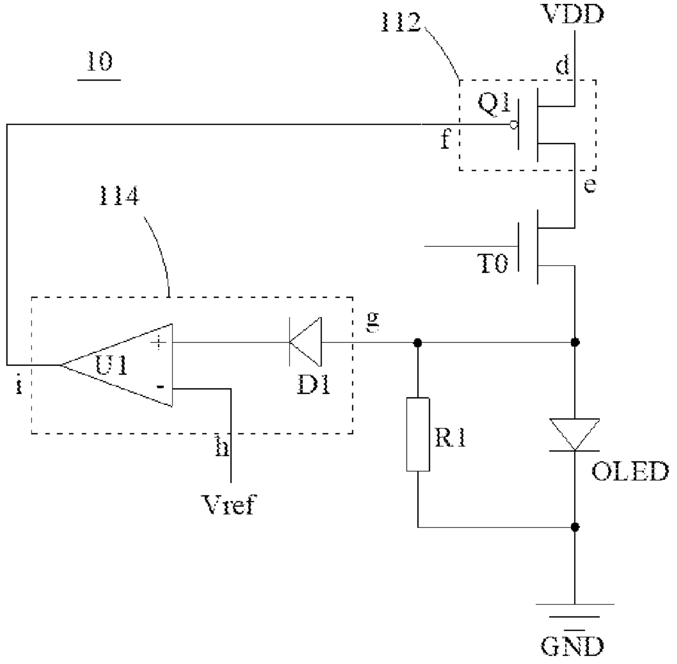
FIG. 5 is a structural schematic view of a pixel driving circuit according to an embodiment II of the present disclosure.

FIG. 5 is a structural schematic view of a pixel driving circuit according to an embodiment II of the present disclosure. As shown in FIG. 5, the control module 110 includes a sampling resistor R1, a switching unit 112, and a first voltage comparison unit 114.

In detail, the sampling resistor R1 is connected in parallel with the light-emitting unit OLED. That is, a first end of the sampling resistor R1 is connected to the anode of the light-emitting unit OLED, and a second end of the sampling resistor R1 is connected to the cathode of the light-emitting unit OLED.

The switching unit 112 has a first end d, a second end e and a control end f. The first end d of the switching unit 112 is the first end a of the control module 110, and the second end e of the switching unit 112 is the second end b of the control module 110. Taking "the first end a of the control module 110 being configured to allow the power supply voltage VDD to be input, and the second end b of the control module 110 being connected to the first pole of the driving transistor T0" as an example, in other words, the first end d of the switching unit 112 is configured to allow for the power supply voltage VDD to be input, and the second end e of the switching unit 112 is connected to the first pole of the driving transistor T0. In some embodiments, when "the first end a of the control module 110 is connected to the second pole of the driving transistor T0, and the second end b of the control module 110 is connected to the light-emitting unit OLED", a connection manner of the switching unit 112 may be as follows: the first end d of the switching unit 112 is connected to the second pole of the driving transistor T0, and the second end e of the switching unit 112 is connected to the light-emitting unit OLED. This will not be repeatedly described.

The first voltage comparison unit 114 has a first input end g, a second input end h, and an output end i. The first input end g of the first voltage comparison unit 114 is connected to the light-emitting unit OLED. The second input end h of the first voltage comparison unit 114 is configured to allow a reference voltage Vref to be input. The output end i of the first voltage comparison unit 114 is connected to the control end f of the switching unit 112. The first voltage comparison unit 114 is configured to compare a value of a voltage input through the first input end g and a value of a voltage input through the second input end h. When the value of the voltage input through the first input end g is greater than the value of the voltage input through the second input end h, the first voltage comparison unit 114 outputs a high voltage level signal. When the value of the voltage input through the first input end g is less than or equal to the value of the voltage input through the second input end h, the first voltage comparison unit 114 outputs a low voltage level signal. In other words, when a voltage of the light-emitting unit OLED is greater than the reference voltage Vref, the first voltage comparison unit 114 outputs the high voltage level signal to control the first end d and the second end e of the switching unit 112 to be disconnected, i.e., to control the switching unit 112 to be switched off. When the voltage of the light-emitting unit OLED is less than or equal to the reference voltage Vref, the first voltage comparison unit 114 outputs the low voltage level signal to control the first end d and the second end e to be conducted with each other, i.e., to control the switching unit 112 to be conducted.

In the present embodiment, the first voltage comparison unit 114 controls the switching unit 112 to be switched off when the voltage of the light-emitting unit OLED is greater than the reference voltage Vref. In other words, the control module 110 is switched off when the voltage of the light-emitting unit OLED is greater than the reference voltage Vref. Therefore, when the driving transistor T0 outputs the driving current, the driving current shall meet the following principle: a product of the value of the driving current and a resistance value of the sampling resistor R1 is less than or equal to the value of the reference voltage Vref. That is, a maximum current value is equal to the value of the reference voltage Vref divided by the resistance value of the sampling resistor R1. For the pixel driving circuit 10, the value of the driving current, which is output from the driving transistor T0 to the light-emitting unit OLED, may be limited to be less than the maximum current value, such that the light-emitting unit OLED may be protected.

Figure 6:
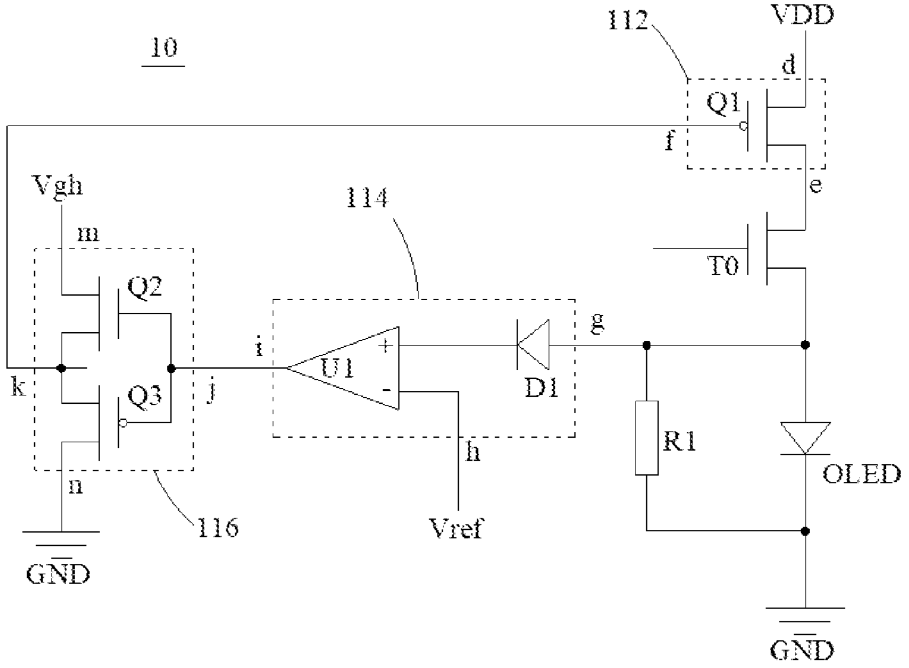
FIG. 6 is a structural schematic view of a first pixel driving circuit according to the embodiment II of the present disclosure.

FIG. 6 is a structural schematic view of a first pixel driving circuit according to the embodiment II of the present disclosure. As shown in FIG. 6, in some embodiments, the first voltage comparison unit 114 includes: a first diode D1 and a first voltage comparator U1. The switching unit 112 includes a first transistor Q1, which is a P-type transistor being conducted at the low voltage level.

In detail, an anode of the first diode D1 is connected to the light-emitting unit OLED, and a cathode of the first diode D1 is connected to an in-phase input end of the first voltage comparator U1. An invert-phase input end of the first voltage comparator U1 is configured to allow the reference voltage Vref to be input. An output end of the first voltage comparator U1 is connected to the control end f of the switching unit 112. That is, the output end of the first voltage comparator U1 is connected to a control pole of the first transistor Q1. A first pole of the first transistor Q1 is configured to allow the power supply voltage VDD to be input, and a second pole of the first transistor Q1 is connected to the first pole of the driving transistor T0. In this way, when the voltage of the light-emitting unit OLED is greater than the reference voltage Vref, a voltage input to the in-phase input end of the first voltage comparator U1 is greater than a voltage input to the invert-phase input end of the first voltage comparator U1. The first voltage comparator U1 outputs the high voltage level signal to control the first transistor Q1 to be switched off. On the other way, when the voltage of the light-emitting unit OLED is less than or equal to the reference voltage Vref, the voltage input to the in-phase input end of the first voltage comparator U1 is less than or equal to the voltage input to the invert-phase input end of the first voltage comparator U1. The first voltage comparator U1 outputs the low voltage level signal, and the first transistor Q1 is conducted.

Figure 7:
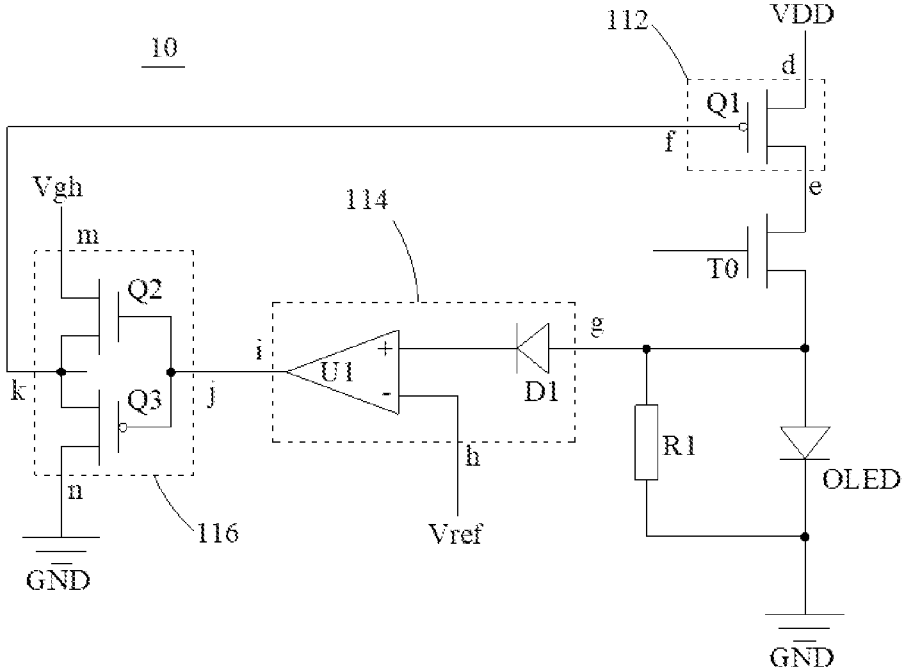
FIG. 7 is a structural schematic view of a second pixel driving circuit according to the embodiment II of the present disclosure.

In some embodiments, as shown in FIG. 7, the control module 110 further includes a control unit 116.

In detail, the control unit 116 has a first end m, a second end n, an input end j, and an output end k. The first end m of the control unit 116 is configured to allow the high voltage level signal Vgh to be input. The second end n of the control unit 116 is connected to the ground GND. The input end j of the control unit 116 is connected to the output end i of the first voltage comparison unit 114. The output end k of the control unit 116 is connected to the control end f of the switching unit 112. When the first voltage comparison unit 114 outputs the high voltage level signal, the control unit 116 outputs the high voltage level signal to the control end f of the switching unit 112. When the first voltage comparison unit 114 outputs the low voltage level signal, the control unit 116 outputs the low voltage level signal to the control end f of the switching unit 112.

In some embodiments, as shown in FIG. 7, the control unit 116 includes a second transistor Q2 and a third transistor Q3. The second transistor Q2 is an N-type transistor being conducted at the high voltage level, and the third transistor Q3 is a P-type transistor being conducted at the low voltage level. A first pole of the second transistor Q2 is configured to allow the high voltage level signal Vgh to be input. A second pole of the second transistor Q2 is connected to a first pole of the third transistor Q3 and to the control end f of the switching unit 112. A second pole of the third transistor Q3 is connected to the ground line GND. Each of a control pole of the second transistor Q2 and a control pole of the third transistor Q3 is connected to the output end i of the first voltage comparison unit 114. In this way, when the first voltage comparison unit 114 outputs the high voltage level signal, the second transistor Q2 is conducted, and the third transistor Q3 is switched off. In this case, the high voltage level signal Vgh, which is input to the first pole of the second transistor Q2, may be further output to the control end f of the switching unit 112 through the second transistor Q2, such that the switching unit 112 is controlled to be switched off. When the first voltage comparison unit 114 outputs the low voltage level signal, the second transistor Q2 is switched off, and the third transistor Q3 is conducted. In this case, the control end f of the switching unit 112 may be connected to the ground GND through the third transistor Q3, such that the switching unit 112 may be controlled to be conducted. In the present embodiment, the second transistor Q2 and the third transistor Q3 are complementary to each other. On one hand, the complementary transistors may have a low power consumption, reducing power consumption of the pixel driving circuit 10. On the other hand, a voltage of the high voltage level signal, which is output from the control unit 116 to the switching unit 112, may be controlled, that is, the voltage may be equal to the value of the high voltage level signal Vgh, which is input through first pole of the second transistor Q2.

Figure 8:
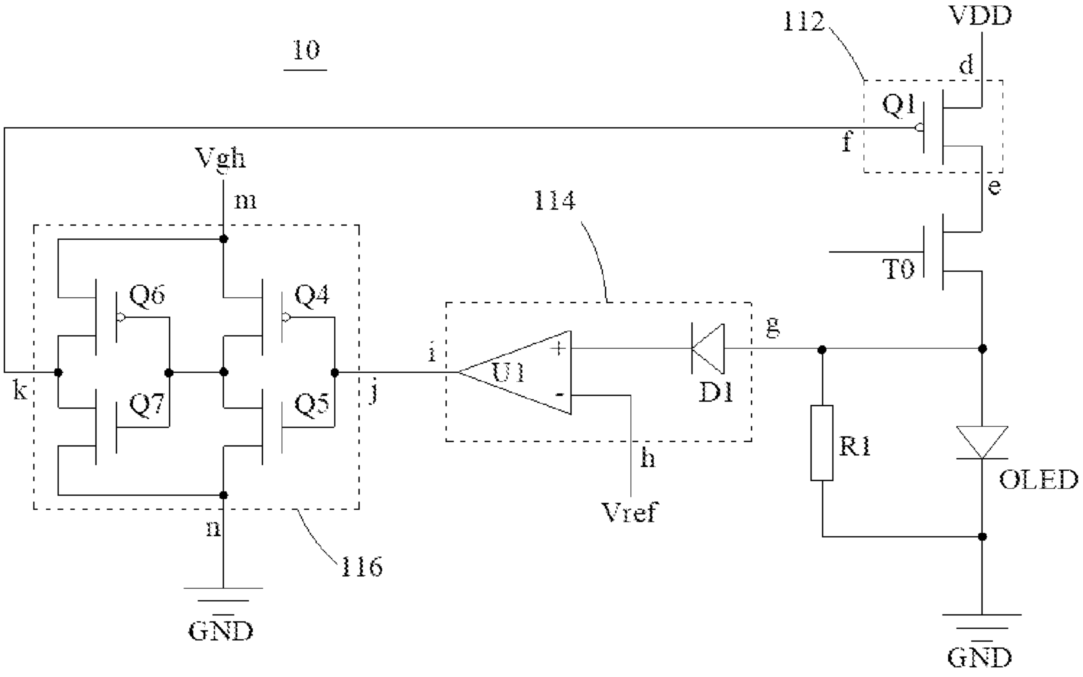
FIG. 8 is a structural schematic view of a third pixel driving circuit according to the embodiment II of the present disclosure.

In some embodiments, as shown in FIG. 8, the control unit 116 includes a fourth transistor Q4, a fifth transistor Q5, a sixth transistor Q6, and a seventh transistor Q7. Each of the fourth transistor Q4 and the sixth transistor Q6 is a P-type transistor being conducted at the low voltage level. Each of the fifth transistor Q5 and the seventh transistor Q7 is a N-type transistor being conducted at the high voltage level. Each of a first pole of the fourth transistor Q4 and a first pole of the sixth transistor Q6 is configured to allow the high voltage level signal Vgh to be input. A second pole of the fourth transistor Q4, a first pole of the fifth transistor Q5, a control pole of the sixth transistor Q6, and a control pole of the seventh transistor Q7 are connected to a same node. A second pole of the sixth transistor Q6 and a first pole of the seventh transistor Q7 are connected to the control end f of the switching unit 112. A second pole of the fifth transistor Q5 and a second pole of the seventh transistor Q7 are connected to the ground GND. A control pole of the fourth transistor Q4 and a control pole of the fifth transistor Q5 are connected to the output end i of the first voltage comparison unit 114. In this way, when the first voltage comparison unit 114 outputs the high voltage level signal, the fifth transistor Q5 is conducted, and the fourth transistor Q4 is switched off. When the fifth transistor Q5 is conducted, the control pole of the sixth transistor Q6 and the control pole of the seventh transistor Q7 are connected to the ground GND, the sixth transistor Q6 is conducted, and the seventh transistor Q7 is switched off. In this case, the high voltage level signal Vgh, which is input to the first pole of the sixth transistor Q6, may be output to the control end f of the switching unit 112 through the sixth transistor Q6, such that the switching unit 112 is controlled to be switched off. When the first voltage comparison unit 114 outputs the low voltage level signal, the fifth transistor Q5 is switched off, and the fourth transistor Q4 is conducted. When the fourth transistor Q4 is conducted, the high voltage level signal Vgh, which is input from the first pole of the fourth transistor Q4, may be output to the control pole of the sixth transistor Q6 and the control pole of the seventh transistor Q7, allowing the seventh transistor Q7 to be conducted and allowing the sixth transistor Q6 to be switched off. In this case, the control end f of the switching unit 112 may be connected to the ground GND through the seventh transistor Q7, such that the switching unit 112 may be controlled to be conducted. In the present embodiment, the fourth transistor Q4 and the fifth transistor Q5 are complementary to each other, and the sixth transistor Q6 and the seventh transistor Q7 are complementary to each other. On one hand, complementary transistors may have a low power consumption, reducing the power consumption of the pixel driving circuit 10. On the other hand, a value of the high voltage level signal, which is output from the control unit 116 to the switching unit 112, may be controlled, that is, the value of the high voltage level signal is equal to the value of the high voltage level signal Vgh, which is input to the first pole of the fourth transistor Q4 and to the first pole of the sixth transistor Q6.

In a second implementation, the preset current range is a range that does not have a negative current. The negative current herein refers to a current that flows from the cathode of the light-emitting unit OLED to the anode of the light-emitting unit OLED.

Embodiment III

Figure 9:
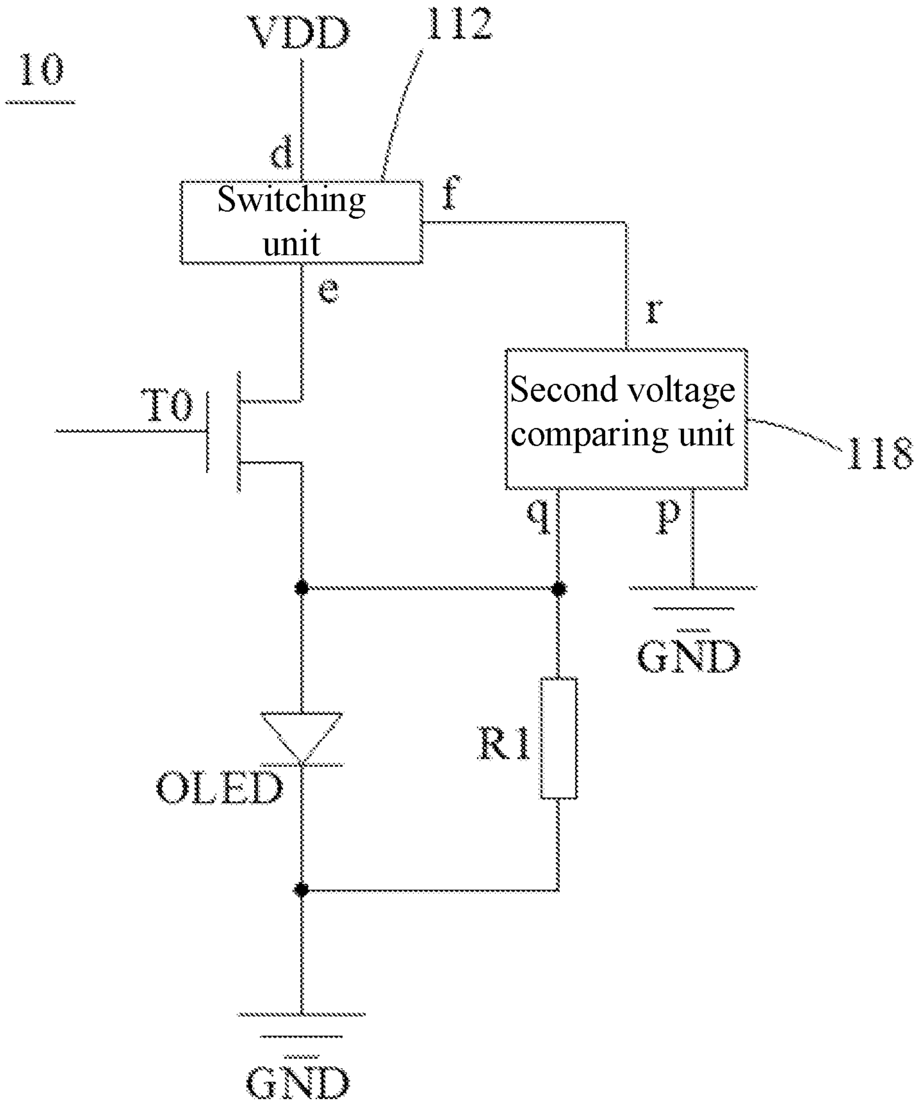
FIG. 9 is a structural schematic view of a pixel driving circuit according to an embodiment III of the present disclosure.

FIG. 9 is a structural schematic view of a pixel driving circuit according to an embodiment III of the present disclosure. As shown in FIG. 9, the control module 110 includes a sampling resistor R1, a switching unit 112, and a second voltage comparison unit 118.

In detail, the sampling resistor R1 is connected in parallel with the light-emitting unit OLED. That is, a first end of the sampling resistor R1 is connected to the anode of the light-emitting unit OLED, and a second end of the sampling resistor R1 is connected to the cathode of the light-emitting unit OLED.

The switching unit 112 has a first end d, a second end e, and a control end f. The first end d of the switching unit 112 is the first end a of the control module 110, and the second end e of the switching unit 112 is the second end b of the control module 110. Taking "the first terminal a of the control module 110 being configured to allow the power supply voltage VDD to be input, and the second terminal b of the control module 110 being connected to the first pole of the driving transistor T0" as an example, in other words, the first end d of the switching unit 112 is configured to allow the power supply voltage VDD to be input, and the second end e of the switching unit 112 is connected to the first pole of the driving transistor T0. In some embodiments, when "the first end a of the control module 110 is connected to the second pole of the driving transistor T0, and the second end b of the control module 110 is connected to the light-emitting unit OLED", a connection manner of the switching unit 112 may be as follows: the first end d of the switching unit 112 is connected to the second pole of the driving transistor T0, and the second end e of the switching unit 112 is connected to the light-emitting unit OLED. This will not be repeated described.

The second voltage comparison unit 118 has a first input end p, a second input end q, and a control end r. The first input end p of the second voltage comparison unit 118 is connected to the ground GND. The second input end q of the second voltage comparison unit 118 is connected to the light-emitting unit OLED. The output end r of the second voltage comparison unit 118 is connected to the control end f of the switching unit 112. The second voltage comparison unit 118 is configured to compare a value of a voltage input through the first input end p to a value of a voltage input through the second input end q. When the voltage input through the first input end p is greater than the voltage input through the second input end q, the second voltage comparison unit 118 outputs the high voltage level signal. When the voltage input through the first input end p is less than or equal to the voltage input through the second input end q, the second voltage comparison unit 118 outputs the low voltage level signal. In other words, when a voltage of the ground GND (i.e., zero voltage) is greater than a voltage of the light-emitting unit OLED, the second voltage comparison unit 118 outputs the high voltage level signal to control the first end d to be disconnected to the second end e, i.e., to control the switching unit 112 to be switched off. When the voltage of the ground GND (i.e., zero voltage) is less than or equal to the voltage of the light-emitting unit OLED, the second voltage comparison unit 118 outputs the low voltage level signal to control the first end d to be conducted to the second end e, i.e., to control the switching unit 112 to be conducted.

In the present embodiment, when the voltage of the ground GND is greater than the voltage of the light-emitting unit OLED, the second voltage comparison unit 118 controls the switching unit 112 to be switched off. In other words, when the voltage of ground GND is greater than the voltage of the light-emitting unit OLED, the control module 110 is switched off. Since the voltage of ground GND is zero voltage, when the driving transistor T0 outputs the driving current, the driving current shall meet the following: a voltage of the anode of the light-emitting unit OLED is not a negative voltage, i.e., no negative current is generated in the light-emitting unit OLED. For the pixel driving circuit 10, the driving current, which is output from the driving transistor T0 to the light-emitting unit OLED, may be limited to be a positive current, such that the light-emitting unit OLED may be protected. The positive current herein refers to a current that flows from the anode of the light-emitting unit OLED to the cathode of the light-emitting unit OLED.

Figure 10:
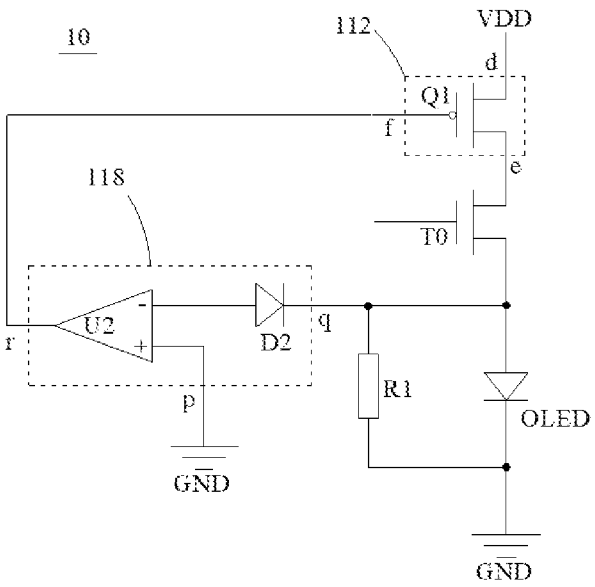
FIG. 10 is a structural schematic view of a first pixel driving circuit according to the embodiment III of the present disclosure.

FIG. 10 is a structural schematic view of a first pixel driving circuit according to the embodiment III of the present disclosure. As shown in FIG. 10, in some embodiments, the second voltage comparison unit 118 includes: a second diode D2 and a second voltage comparator U2. The switching unit 112 includes the first transistor Q1, which is the P-type transistor being conducted at the low voltage level.

In detail, a cathode of the second diode D2 is connected to the light-emitting unit OLED, and an anode of the second diode D2 is connected to an invert-phase input end of the second voltage comparator U2. An in-phase input end of the second voltage comparator U2 is connected to the ground GND. An output end of the second voltage comparator U2 is connected to the control end f of the switching unit 112. That is, the output end of the second voltage comparator U2 is connected to the control pole of the first transistor Q1. The first pole of the first transistor Q1 is configured to allow the power supply voltage VDD to be input, and the second pole of the first transistor Q1 is connected to the first pole of the driving transistor T0. In this way, when the voltage of the ground GND is greater than the voltage of the light-emitting unit OLED, that is, when the negative current is flowing in the light-emitting unit OLED, the voltage input through the in-phase input end of the second voltage comparator U2 is greater than the voltage input to the invert-phase input end of the second voltage comparator U2, and the second voltage comparator U2 outputs the high voltage level signal to control the first transistor Q1 to be switched off. On the other way, when the voltage of the ground GND is less than or equal to the voltage of the light-emitting unit OLED, i.e., when no negative current is flowing in the light-emitting unit OLED, the voltage input through the in-phase input end of the second voltage comparator U2 is less than or equal to the voltage input through the invert-phase input end of the second voltage comparator U2, the second voltage comparator U2 outputs the low voltage level signal, and the first transistor Q1 is conducted.

Figure 11:
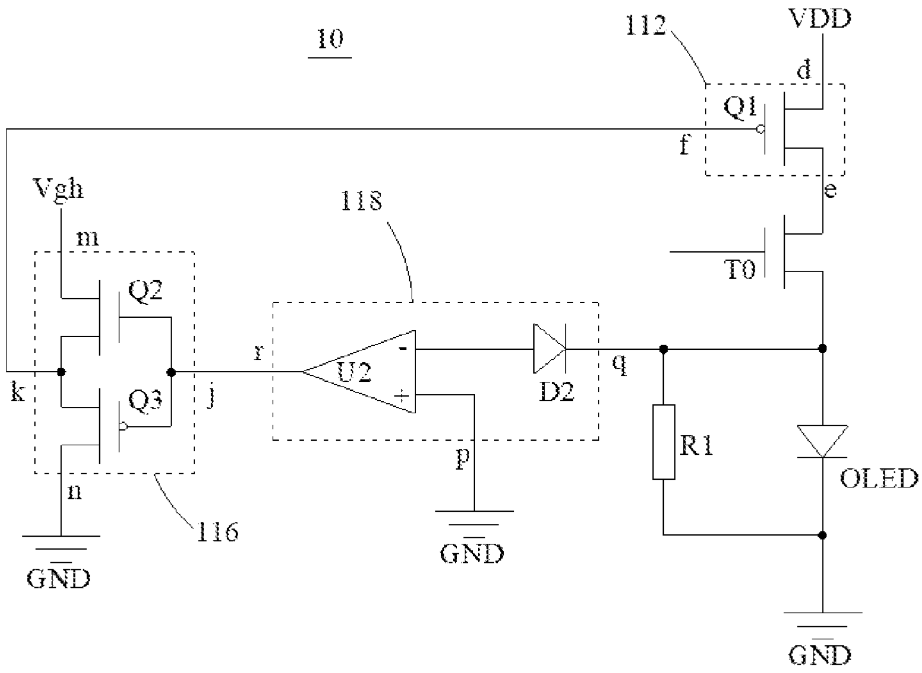
FIG. 11 is a structural schematic view of a second pixel driving circuit according to the embodiment III of the present disclosure.

In some embodiments, as shown in FIG. 11, the control module 110 further includes a control unit 116.

In detail, the control unit 116 has a first end m, a second end n, an input end j, and an output end k. The first end m of the control unit 116 is configured to allow the high voltage level signal Vgh to be input. The second end n of the control unit 116 is connected to the ground GND. The input end j of the control unit 116 is connected to the output end r of the second voltage comparison unit 118, and the output end k of the control unit 116 is connected to the control end f of the switching unit 112. When the second voltage comparison unit 118 outputs the high voltage level signal, the control unit 116 outputs the high voltage level signal to the control end f of the switching unit 112. When the second voltage comparison unit 118 outputs the low voltage level signal, the control unit 116 outputs the low voltage level signal to the control end f of the switching unit 112.

In some embodiments, as shown in FIG. 11, the control unit 116 includes a second transistor Q2 and a third transistor Q3. The second transistor Q2 is an N-type transistor being conducted at the high voltage level. The third transistor Q3 is a P-type transistor being conducted at the low voltage level. A first pole of the second transistor Q2 is configured to allow the high voltage level signal Vgh to be input. A second pole of the second transistor Q2 and a first pole of the third transistor Q3 are connected to the control end f of the switching unit 112. A second pole of the third transistor Q3 is connected to the ground GND. A control pole of the second transistor Q2 and a control pole of the third transistor Q3 are connected to the output end r of the second voltage comparison unit 118. In this way, when the second voltage comparison unit 118 outputs the high voltage level signal, the second transistor Q2 is conducted, and the third transistor Q3 is switched off. In this case, the high voltage level signal Vgh, which is input to the first pole of the second transistor Q2, may be output through the second transistor Q2 to reach the control end f of the switching unit 112, such that the switching unit 112 is controlled to be switched off. When the second voltage comparison unit 118 outputs the low voltage level signal, the second transistor Q2 is switched off, and the third transistor Q3 is conducted. In this case, the control end f of the switching unit 112 may be connected to the ground GND through the third transistor Q3, such that the switching unit 112 is controlled to be conducted. In the present embodiment, the second transistor Q2 and the third transistor Q3 are complementary to each other. On one hand, complementary transistors may have a low power consumption, reducing the power consumption of the pixel driving circuit 10. On the other hand, the voltage of the high voltage level signal, which is output by the control unit 116 to the switching unit 112, may be controlled. That is, the voltage of the high voltage level signal may be equal to the voltage of the high voltage level signal Vgh that is input through the first pole of the second transistor Q2.

Figure 12:
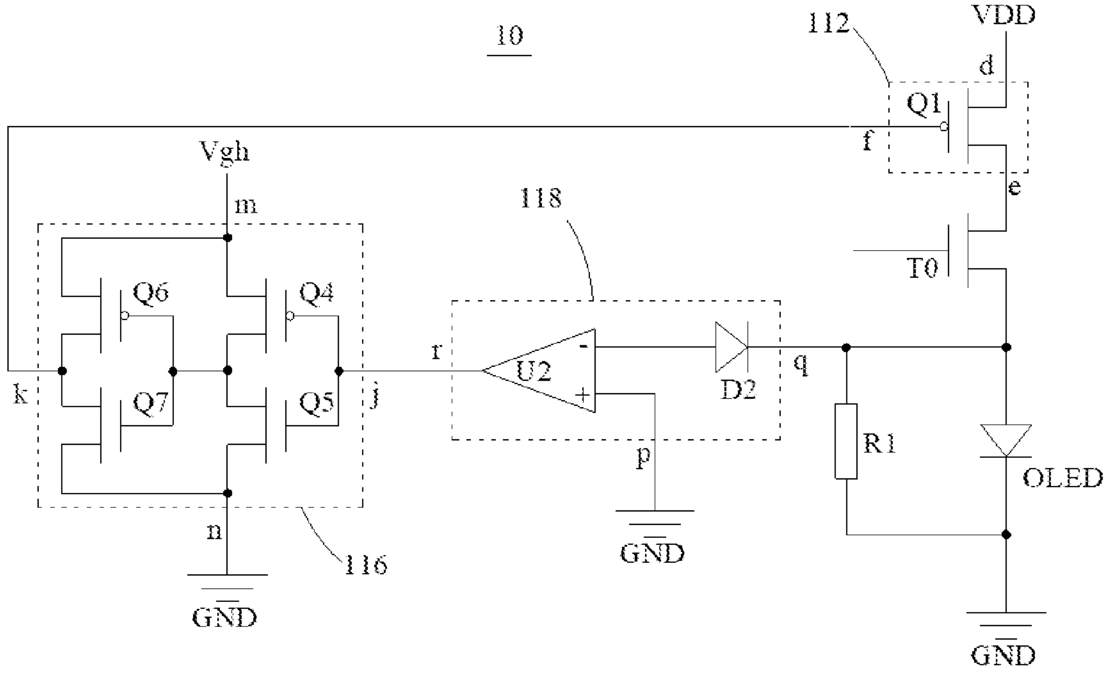
FIG. 12 is a structural schematic view of a third pixel driving circuit according to the embodiment III of the present disclosure.

In some embodiments, as shown in FIG. 12, the control unit 116 includes a fourth transistor Q4, a fifth transistor Q5, a sixth transistor Q6, and a seventh transistor Q7. Each of the fourth transistor Q4 and the sixth transistor Q6 is a P-type transistor being conducted at the low voltage level. Each of the fifth transistor Q5 and the seventh transistor Q7 is an N-type transistor being conducted at the high voltage level. A first pole of the fourth transistor Q4 and a first pole of the sixth transistor Q6 are configured to allow the high voltage level signal Vgh to be input. A second pole of the fourth transistor Q4, a first pole of the fifth transistor Q5, a control pole of the sixth transistor Q6, and a control pole of the seventh transistor Q7 are connected to a same node. A second pole of the sixth transistor Q6 and a first pole of the seventh transistor Q7 are connected to the control end f of the switching unit 112. A second pole of the fifth transistor Q5 and a second pole of the seventh transistor Q7 are connected to the ground GND. A control pole of the fourth transistor Q4 and a control pole of the fifth transistor Q5 are connected to the output end r of the second voltage comparison unit 118. In this way, when the second voltage comparison unit 118 outputs the high voltage level signal, the fifth transistor Q5 is conducted, and the fourth transistor Q4 is switched off. When the fifth transistor Q5 is conducted, a control pole of the sixth transistor Q6 and a control pole of the seventh transistor Q7 are connected to the ground GND, the sixth transistor Q6 is conducted, and the seventh transistor Q7 is switched off. In this case, the high voltage level signal Vgh, which is input through the first pole of the sixth transistor Q6, may be output to the control end f of the switching unit 112 via the sixth transistor Q6, such that the switching unit 112 is controlled to be switch off. When the second voltage comparison unit 118 outputs the low voltage level signal, the fifth transistor Q5 is switched off, and the fourth transistor Q4 is conducted. When the fourth transistor Q4 is conducted, the high voltage level signal Vgh, which is input from the first pole of the fourth transistor Q4, may be output to the control pole of the sixth transistor Q6 and the control pole of the seventh transistor Q7, allowing the seventh transistor Q7 to be conducted and allowing the sixth transistor Q6 to be switched off. In this case, the control end f of the switching unit 112 may be connected to the ground GND through the seventh transistor Q7, such that the switching unit 112 is controlled to be conducted. In the present embodiment, the fourth transistor Q4 and the fifth transistor Q5 are complementary to each other. The sixth transistor Q6 and the seventh transistor Q7 are complementary to each other. On one hand, complementary transistors may have a low power consumption, reducing the power consumption of the pixel driving circuit 10. On the other hand, the value of the high voltage level signal, which is output from the control unit 116 to the switching unit 112, may be controlled, i.e., the value of the high voltage level signal may be equal to the value of the high voltage level signal Vgh, which is input to the first pole of the fourth transistor Q4 and the first pole of the sixth transistor Q6.

In a third implementation, the preset current range is a range that does not exceed a maximum current value and does not have a negative current.

Embodiment IV

Figure 13:
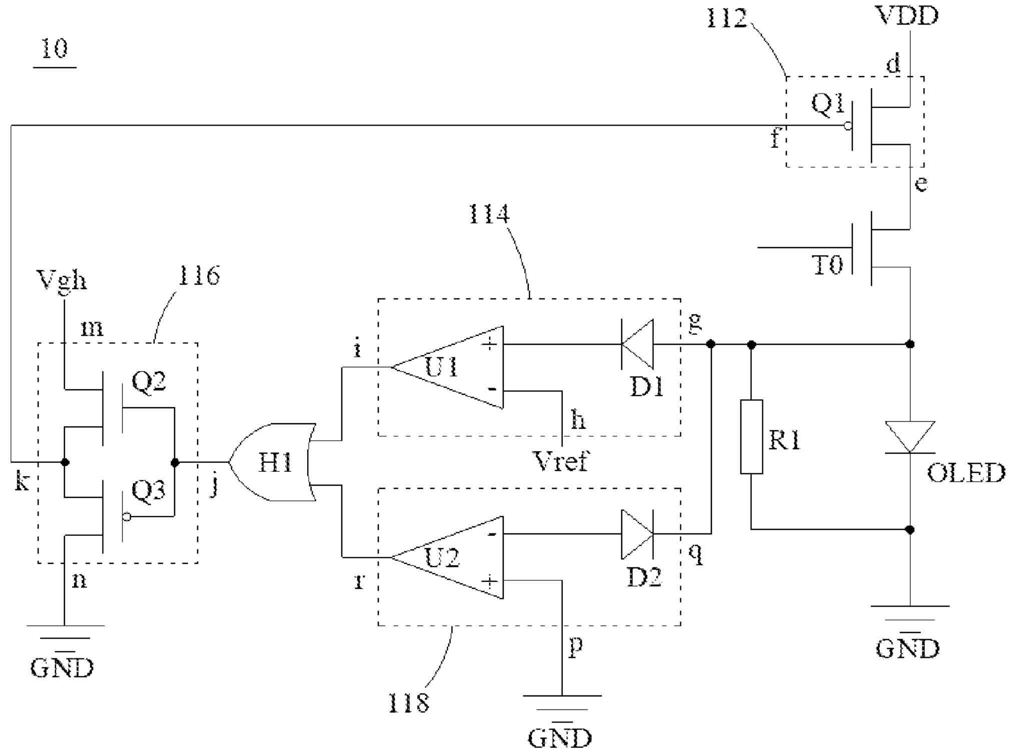
FIG. 13 is a structural schematic view of a first pixel driving circuit according to the embodiment IV of the present disclosure.

FIG. 13 is a structural schematic view of a first pixel driving circuit according to the embodiment IV of the present disclosure. As shown in FIG. 13, the pixel driving circuit 10 may include the sampling resistor R1 as shown in the Embodiment III, the switching unit 112 as shown in the Embodiment III, the second voltage comparison unit 118 as shown in the Embodiment III, and the first voltage comparison unit 114 as shown in the Embodiment II.

In detail, the sampling resistor R1 is connected in parallel with the light-emitting unit OLED. The first end d of the switching unit 112 is configured to allow the power supply voltage VDD to be input, and the second end e of the switching unit 112 is connected to the first pole of the driving transistor T0. The first input end p of the second voltage comparison unit 118 is connected to the ground GND, and the second input end q of the second voltage comparison unit 118 is connected to the light-emitting unit OLED. The first input end g of the first voltage comparison unit 114 is connected to the light-emitting unit OLED, and the second input end h of the first voltage comparison unit 114 is configured to allow the reference voltage Vref to be input. In the present embodiment, the control module 110 further includes an or-gate circuit. The or-gate circuit has a first input end, a second input end, and an output end. The output end i of the first voltage comparison unit 114 is connected to the first input end of the or-gate circuit. The output end r of the second voltage comparison unit 118 is connected to the second input end of the or-gate circuit. The output end of the or-gate circuit is connected to the control end f of the switching unit 112. When the high voltage level signal is input through at least one of the first input end and the second input end of the or-gate circuit, the output end of the or-gate circuit outputs the high voltage level signal. In some embodiments that are not shown, the first end d of the switching unit 112 may alternatively be connected to the second pole of the driving transistor T0. In this case, the second end e of the switching unit 112 is connected to the light-emitting unit OLED, which will not be repeatedly described.

Figure 14:
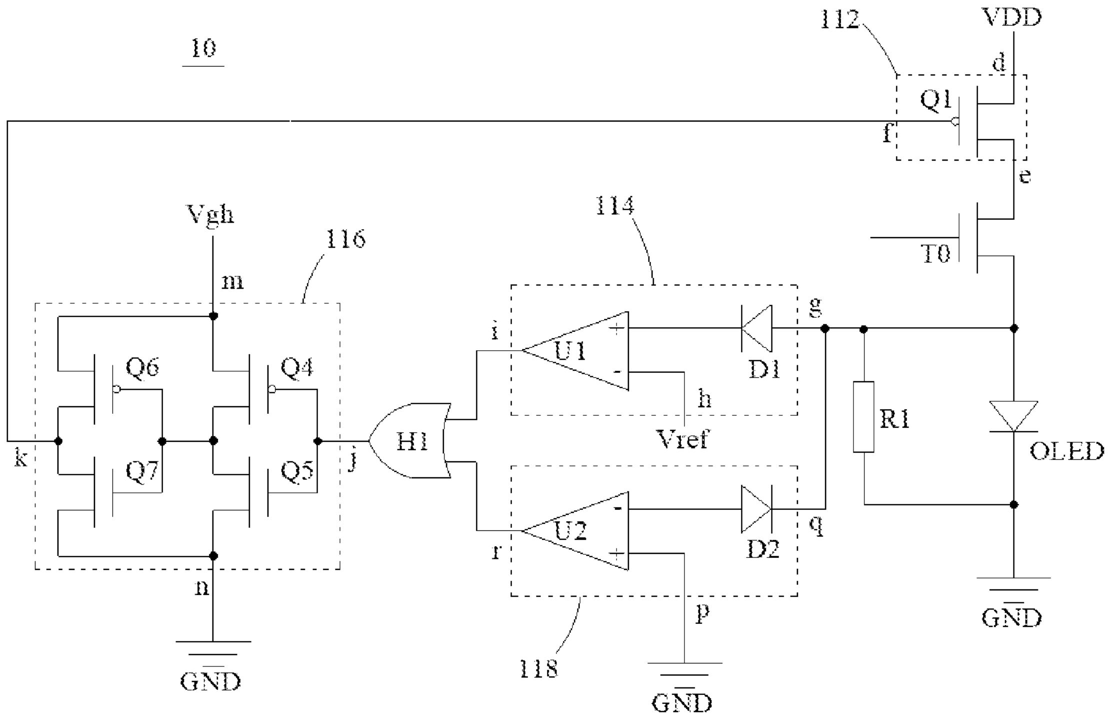
FIG. 14 is a structural schematic view of a second pixel driving circuit according to the embodiment IV of the present disclosure.

In the present embodiment, as shown in FIG. 13, the control module 110 may include a control unit 116, which is composed of a second transistor Q2 and a third transistor Q3. Alternatively, as shown in FIG. 14, the control module 110 may include a control unit 116 which is composed of a fourth transistor Q4, a fifth transistor Q5, a sixth transistor Q6, and a seventh transistor Q7. Details of these circuits will not be repeated described herein.

Figure 15:
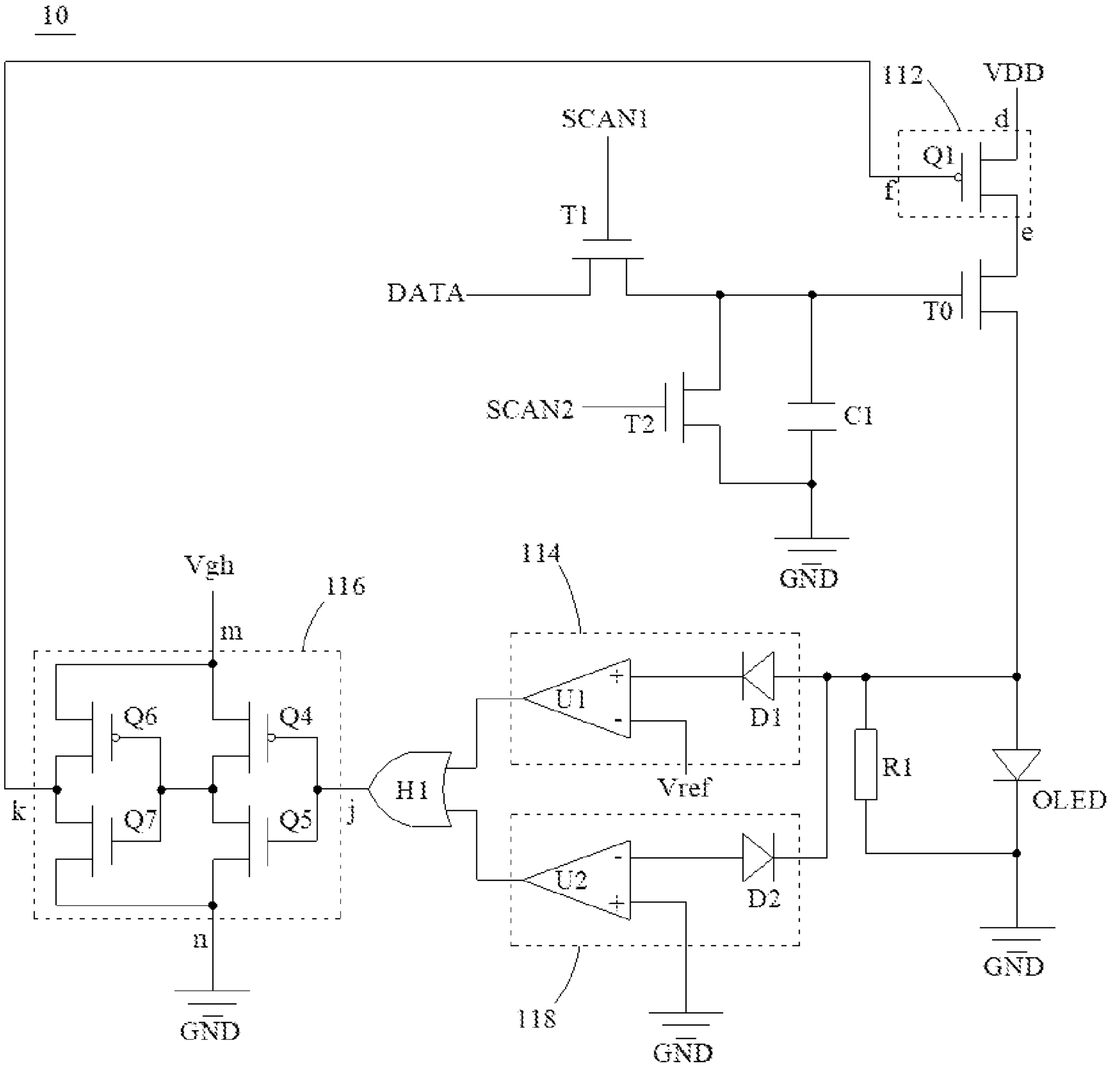
FIG. 15 is a structural schematic view of a third pixel driving circuit according to the embodiment IV of the present disclosure.

FIG. 15 is a structural schematic view of still another pixel driving circuit 10 according to the embodiment IV of the present disclosure. The pixel driving circuit 10 herein includes the control module 110 in the pixel driving circuit 10 shown in FIG. 14 and the 3T1C circuit structure in the pixel driving circuit 10 shown in FIG. 3. An operation process of the pixel driving circuit 10 will be described in details in the following by referring to FIG. 15.

An initial state of the first transistor Q1 is being conducted. When the pixel driving circuit 10 is operating, within a first time period, the first scan signal SCAN1 is input to the control pole of the switching transistor T1. At this moment, the first scan signal SCAN1 is at the high voltage level, such that the switching transistor T1 is controlled to be conducted and charges the energy storage capacitor C1, the second scan signal SCAN2 is at the low voltage level, and the discharging transistor T2 is switched off. Within a second time period, the second scan signal SCAN2 is input to the control pole of the discharging transistor T2. At this moment, the second scan signal SCAN2 is at the high voltage level, the discharging transistor T2 is conducted, and the energy storage capacitor C1 is discharged to ground through the discharging transistor T2. The first scan signal SCAN1 is at the low voltage signal, and the switching transistor T1 is switched off. Within the third time period, the first scan signal SCAN1 is input to the control pole of the switching transistor T1. At this moment, the first scan signal SCAN1 is at the high voltage level, such that the switching transistor T1 is controlled to be conducted and charges the energy storage capacitor C1. The second scan signal SCAN2 is at the low voltage level, and the discharging transistor T2 is switched off. Within the fourth time period, both the first scan signal SCAN1 and the second scan signal SCAN2 are at the low voltage level, and the switching transistor T1 and the discharging transistor T2 are switched off. At this moment, the energy storage capacitor C1 discharges to the driving transistor T0, and the driving transistor T0 is conducted. Since the first transistor Q1 is conducted, the driving transistor T0 outputs the driving current to the light-emitting unit OLED.

A process of the driving transistor T0 outputting the driving current to the light-emitting unit OLED is as follows:

The voltage input through the in-phase input end of the first voltage comparator U1 is equal to the voltage of the anode of the light-emitting unit OLED, i.e., equal to a product of the value of the driving current and the resistance value of the sampling resistor R1. When the voltage of the light-emitting unit OLED is greater than the reference voltage Vref, the first voltage comparator U1 outputs the high voltage level signal. At this moment, the or-gate circuit outputs the high voltage level signal, the fifth transistor Q5 is conducted, and the fourth transistor Q4 is switched off. When the fifth transistor Q5 is conducted, the control pole of the sixth transistor Q6 and the control pole of the seventh transistor Q7 are connected to the ground GND, the sixth transistor Q6 is conducted, and the seventh transistor Q7 is switched off. In this case, the high voltage level signal Vgh, which is input to the first pole of the sixth transistor Q6, may be output to the control pole of the first transistor Q1 through the sixth transistor Q6, the first transistor Q1 is switched off, and the driving transistor T0 stops outputting the driving current.

The voltage, which is input through the invert-phase input end of the second voltage comparator U2, is equal to the voltage of the anode of the light-emitting unit OLED. When the voltage of the ground GND is greater than the voltage of the light-emitting unit OLED, i.e., when a negative current is flowing in the light-emitting unit OLED, the second voltage comparator U2 outputs the high voltage level signal. At this moment, the or-gate circuit outputs the high voltage level signal, the fifth transistor Q5 is conducted, and the fourth transistor Q4 is switched off. When the fifth transistor Q5 is conducted, the control pole of the sixth transistor Q6 and the control pole of the seventh transistor Q7 are connected to the ground GND, the sixth transistor Q6 is conducted, and the seventh transistor Q7 is switched off. In this case, the high voltage level signal Vgh, which is input through the first pole of the sixth transistor Q6, may be output via the sixth transistor Q6 to reach the control pole of the first transistor Q1, such that the first transistor Q1 is switched off, and the driving transistor T0 stops outputting the driving current.

When the voltage of the light-emitting unit OLED is less than or equal to the reference voltage Vref, the first voltage comparator U1 outputs the low voltage level signal. Further, when the voltage of the ground GND is less than or equal to the voltage of the light-emitting unit OLED, i.e., when no negative current is flowing in the light-emitting unit OLED, the second voltage comparator U2 outputs the low voltage level signal. In this case, the or-gate circuit outputs the low voltage level signal, the fifth transistor Q5 is switched off, the fourth transistor Q4 is conducted. When the fourth transistor Q4 is conducted, the high voltage level signal Vgh, which is input to the first pole of the fourth transistor Q4, may be output to the control pole of the sixth transistor Q6 and to the control pole of the seventh transistor Q7, allowing the seventh transistor Q7 to be conducted and allowing the sixth transistor Q6 to be switched off. In this case, the control pole of the first transistor Q1 may be connected to the ground GND through the seventh transistor Q7, such that the first transistor Q1 may be controlled to be conducted.

According to the pixel driving circuit 10, the driving current in the light-emitting unit OLED may be prevented from flowing from the cathode to the anode of the light-emitting unit OLED, and the driving current in the light-emitting unit OLED may be prevented from exceeding the maximum current value, such that the light-emitting unit OLED may be protected. The fourth transistor Q4 and the fifth transistor Q5 are complementary to each other, and sixth transistor Q6 and seventh transistor Q7 are complementary to each other. On one hand, complementary transistors may have a low power consumption, reducing the power consumption of the pixel driving circuit 10. On the other hand, the value of the high voltage level signal, which is output from the control unit 116 to the switching unit 112, may be controlled, i.e., the value of the high voltage level signal may be equal to the value of the high voltage level signal Vgh, which is input to the first pole of the fourth transistor Q4 and the first pole of the sixth transistor Q6.

Embodiment V

Embodiments of the present disclosure further provide a display panel including a light-emitting unit OLED and the pixel driving circuit 10 as described in any of the above embodiments. The pixel driving circuit 10 includes the switching transistor T1, the energy storage capacitor C1, the driving transistor T0, and the control module 110.

The first pole of the switching transistor T1 is configured to allow the data voltage DATA to be input, and the second pole of the switching transistor T1 is connected to the energy storage capacitor C1. The first pole of the driving transistor T0 is configured to allow the power supply voltage VDD to be input, and the second pole of the driving transistor T0 is connected to the light-emitting unit OLED. The control pole of the driving transistor T0 is connected to the energy storage capacitor C1. When the energy storage capacitor C1 discharges to the control pole of the driving transistor T0, the driving transistor T0 outputs the driving current to the light-emitting unit OLED. The control module 110 is connected in series with the driving transistor T0. The control module 110 further has a detection end c. The detection end c of the control module 110 is connected to the light-emitting unit OLED to detect the value of the driving current. The control module 110 is disconnected when the value of the driving current exceeds the preset current range to cause the driving transistor T0 to stop outputting the driving current to the light-emitting unit OLED.

In some embodiments, the control module 110 includes: the sampling resistor R1, the switching unit 112, and the first voltage comparison unit 114. The sampling resistor R1 is connected in parallel with the light-emitting unit OLED. The first end d of the switching unit 112 is configured to allow the power supply voltage VDD to be input, and the second end e of the switching unit 112 is connected to the first pole of the driving transistor T0. The first input end g of the first voltage comparison unit 114 is connected to the light-emitting unit OLED, the second input end h of the first voltage comparison unit 114 is configured to allow the reference voltage Vref to be input. The output end i of the first voltage comparison unit 114 is connected to the control end f of the switching unit 112. When the voltage of the light-emitting unit OLED is greater than the reference voltage Vref, the first voltage comparison unit 114 outputs the high voltage level signal to control the switching unit 112 to be switched off.

In some embodiments, the first voltage comparison unit 114 includes: the first diode D1 and the first voltage comparator U1. The switching unit 112 includes the first transistor Q1, which is a P-type transistor. The anode of the first diode D1 is connected to the light-emitting unit OLED, and the cathode of the first diode D1 is connected to the in-phase input end of the first voltage comparator U1. The invert-phase input end of the first voltage comparator U1 is configured to allow the reference voltage Vref to be input, and the output end of the first voltage comparator U1 is connected to the control end f of the switching unit 112. The first pole of the first transistor Q1 is configured to allow the power supply voltage VDD to be input, and the second pole of the first transistor Q1 is connected to the first pole of the driving transistor T0.

In some embodiments, the control module 110 further includes the control unit 116. The first end m of the control unit 116 is configured to allow the high voltage level signal Vgh to be input, and the second end n of the control unit 116 is connected to the ground GND. The input end j of the control unit 116 is connected to the output end i of the first voltage comparison unit 114, and the output end k of the control unit 116 is connected to the control end f of the switching unit 112. When the first voltage comparison unit 114 outputs the high voltage level signal, the control unit 116 outputs the high voltage level signal to the control end f of the switching unit 112. When the first voltage comparison unit 114 outputs the low voltage level signal, the control unit 116 outputs the low voltage level signal to the control end f of the switching unit 112.

In some embodiments, the control unit 116 includes: the second transistor Q2 and the third transistor Q3. The second transistor Q2 is an N-type transistor, and the third transistor Q3 is a P-type transistor. The first pole of the second transistor Q2 is configured to allow the high voltage level signal Vgh to be input, the second pole of the second transistor Q2 and the first pole of the third transistor Q3 are connected to the control end f of the switching unit 112. The second pole of the third transistor Q3 is connected to the ground GND. The control pole of the second transistor Q2 and the control pole of the third transistor Q3 are both connected to the output end i of the first voltage comparison unit 114.

In some embodiments, the control unit 116 includes: the fourth transistor Q4, the fifth transistor Q5, the sixth transistor Q6, and the seventh transistor Q7. The fourth transistor Q4 and the sixth transistor Q6 are P-type transistors, and the fifth transistor Q5 and the seventh transistor Q7 are N-type transistors. The first pole plate of the fourth transistor Q4 and the first pole plate of the sixth transistor Q6 are configured to allow the high voltage level signal Vgh to be input. The second pole of the fourth transistor Q4, the first pole of the fifth transistor Q5, the control pole of the sixth transistor Q6, and the control pole of the seventh transistor Q7 are connected to a same node. The second pole of the sixth transistor Q6 and the first pole of the seventh transistor Q7 are connected to the control end f of the switching unit 112. The second pole of the fifth transistor Q5 and the second pole of the seventh transistor Q7 are connected to the ground GND. The control pole of the fourth transistor Q4 and the control pole of the fifth transistor Q5 are connected to the output end i of the first voltage comparison unit 114.

In some embodiments, the control module 110 includes: the sampling resistor R1, the switching unit 112, and the second voltage comparison unit 118. The sampling resistor R1 is connected in parallel with the light-emitting unit OLED. The first end d of the switching unit 112 is configured to allow the power supply voltage VDD to be input, and the second end e of the switching unit 112 is connected to the first pole of the driving transistor T0. The first input end p of the second voltage comparison unit 118 is connected to the ground GND. The second input end q of the second voltage comparison unit 118 is connected to the light-emitting unit OLED. The output end r of the second voltage comparison unit 118 is connected to the control end f of the switching unit 112. When the voltage of the light-emitting unit OLED is less than the voltage of the ground GND, the second voltage comparison unit 118 outputs the high voltage level signal to control the switching unit 112 to be switched off.

In some embodiments, the second voltage comparison unit 118 includes: the second diode D2 and the second voltage comparator U2. The cathode of the second diode D2 is connected to the light-emitting unit OLED, and the anode of the second diode D2 is connected to the invert-phase input end of the second voltage comparator U2. The in-phase input end of the second voltage comparator U2 is connected to the ground GND, and the output end of the second voltage comparator U2 is connected to the control end f of the switching unit 112.

In some embodiments, the control module 110 further includes: the first voltage comparison unit 114 and the or-gate circuit. The first input end g of the first voltage comparison unit 114 is connected to the light-emitting unit OLED, the second input end h of the first voltage comparison unit 114 is configured to allow the reference voltage Vref to be input. The output end i of the first voltage comparison unit 114 is connected to the first input end of the or-gate circuit. The output end r of the second voltage comparison unit 118 is connected to the second input end of the or-gate circuit. The output end of the or-gate circuit is connected to the control end f of the switching unit 112. When the high voltage level signal is input to at least one of the first input end and the second input end of the or-gate circuit, the or-gate circuit outputs the high voltage level signal.

In the embodiments of the present disclosure, the data voltage DATA charges the energy storage capacitor C1 when the switching transistor T1 is conducted. The storage capacitor C1 discharges to the driving transistor T0 when the switching transistor T1 is switched off. In this way, the driving transistor T0 outputs the driving current to the light-emitting unit OLED to drive the light-emitting unit OLED to emit light. The control module 110 is connected in series with the driving transistor T0. In the process of the driving transistor T0 outputting the driving current to the light-emitting unit OLED, the control module 110 detects the value of the driving current and is disconnected when the value of the driving current exceeds the preset current range, such that the driving transistor T0 cannot output the driving current to the light-emitting unit OLED. In this way, the value of the driving current output from the driving transistor T0 to the light-emitting unit OLED may be limited within the preset current range, and the light-emitting unit OLED is protected. the second transistor Q2 and the third transistor Q3 are complementary to each other. The fourth transistor Q4 and the fifth transistor Q5 are complementary to each other. The sixth transistor Q6 and the seventh transistor Q7 are complementary to each other. On one hand, complementary transistors have a low power consumption, reducing the power consumption of the pixel driving circuit 10. On the other hand, the value of the high voltage level signal, which is output by the control unit 116 to the switching unit 112, may be controlled, i.e., may be equal to the value of the high voltage level signal Vgh, which is input to the first pole of the second transistor Q2 or the fourth transistor Q4 and to the first pole of the sixth transistor Q6.

The above described embodiments are intended only to illustrate the technical solutions of the present disclosure and do not to limit the present disclosure. Although the present disclosure is described in details with reference to the above examples, it shall be understood by any ordinary skilled person in the art that the technical solutions described in the above examples may be modified, or some of the technical features may be replaced with equivalent ones. Such modifications or replacements that do not depart the technical solutions away from the spirit and scope of the present disclosure shall be included in the scope of the present disclosure.

What is claimed is:

1. A pixel driving circuit, comprising: a switching transistor, an energy storage capacitor, and a driving transistor, wherein a first pole of the switching transistor is configured to allow a data voltage to be input to the switching transistor, a second pole of the switching transistor is connected to the energy storage capacitor; a first pole of the driving transistor is configured to allow a power supply voltage to be input to the driving transistor, a second pole of the driving transistor is connected to a light-emitting unit, a control pole of the driving transistor is connected to the energy storage capacitor; and when the energy storage capacitor discharges to the control pole of the driving transistor, the driving transistor outputs a driving current to the light-emitting unit;

the pixel driving circuit further comprises a control module;

wherein the control module is connected in series with the driving transistor, the control module has a detection end, the detection end of the control module is connected to the light-emitting unit to detect a value of the driving current; and when the value of the driving current exceeds a preset current range, the control module is disconnected to allow the driving transistor to stop outputting the driving current to the light-emitting unit;

the control module comprises: a sampling resistor, a switching unit, and a first voltage comparison unit;

wherein the sampling resistor is connected in parallel with the light-emitting unit;

a first end of the switching unit is configured to allow the power supply voltage to be input to the switching unit, and a second end of the switching unit is connected to the first pole of the driving transistor; and a first input end of the first voltage comparison unit is connected to the light-emitting unit, a second input end of the first voltage comparison unit is configured to allow a reference voltage to be input to the first voltage comparison unit, an output end of the first voltage comparison unit is connected to a control end of the switching unit when a voltage of the light-emitting unit is greater than the reference voltage, the first voltage comparison unit outputs a high voltage level signal to control the switching unit to be switched off.

2. The pixel driving circuit according to claim 1, wherein the first voltage comparison unit comprises: a first diode and a first voltage comparator, the switching unit comprises a first transistor, and the first transistor is a P-type transistor;

an anode of the first diode is connected to the light-emitting unit, a cathode of the first diode is connected to an in-phase input end of the first voltage comparator, an invert-phase input end of the first voltage comparator is configured to allow the reference voltage to be input to the first voltage comparator, an output end of the first voltage comparator is connected to a control end of the switching unit; and a first pole of the first transistor is configured to allow the power supply voltage to be input to the first transistor, a second pole of the first transistor is connected to the first pole of the driving transistor.

3. The pixel driving circuit according to claim 1, wherein the control module further comprises a control unit;

a first end of the control unit is configured to allow the high voltage level signal to be input to the control unit, a second end of the control unit is connected to the ground, an input end of the control unit is connected to the output end of the first voltage comparison unit, an output end of the control unit is connected to the control end of the switching unit;

when the first voltage comparison unit outputs the high voltage level signal, the control unit outputs the high voltage level signal to the control end of the switching unit; and when the first voltage comparison unit outputs a low voltage level signal, the control unit outputs the low voltage level signal to the control end of the switching unit.

4. The pixel driving circuit according to claim 3, wherein the control unit comprises: a second transistor and a third transistor; the second transistor Q2 is an N-type transistor, and the third transistor Q3 is a P-type transistor;

a first pole of the second transistor is configured to allow the high voltage level signal to be input to the second transistor, a second pole of the second transistor and a first pole of the third transistor Q3 are connected to the control end of the switching unit, a second pole of the third transistor is connected to the ground; and a control pole of the second transistor and a control pole of the third transistor are connected to the output end of the first voltage comparison unit.

5. The pixel driving circuit according to claim 4, wherein when the first voltage comparison unit outputs the high voltage level signal, the second transistor is conducted, and the third transistor is switched off, the first pole of the second transistor outputs the high voltage level signal to the switching unit to control the switching unit to be switched off; and when the first voltage comparison unit outputs a low voltage level signal, the second transistor is switched off, and the third transistor is conducted, the control end of the switching unit is connected to the ground through the third transistor to control the switching unit to be conducted.

6. The pixel driving circuit according to claim 3, wherein the control unit comprises: a fourth transistor, a fifth transistor, a sixth transistor, and a seventh transistor; the fourth transistor and the sixth transistor are P-type transistors, and the fifth transistor and the seventh transistor are N-type transistors;

a first pole plate of the fourth transistor is configured to allow the high voltage level signal to be input to the fourth transistor, a first pole plate of the sixth transistor is configured to allow the high voltage level signal to be input to the sixth transistor; a second pole of the fourth transistor, a first pole of the fifth transistor, a control pole of the sixth transistor, and a control pole of the seventh transistor are connected to a same node; a second pole of the sixth transistor and a first pole of the seventh transistor are connected to the control end of the switching unit; a second pole of the fifth transistor and a second pole of the seventh transistor are connected to the ground; and a control pole of the fourth transistor and a control pole of the fifth transistor are connected to the output end of the first voltage comparison unit.

7. The pixel driving circuit according to claim 6, wherein when the first voltage comparison unit outputs the high voltage level signal, the fifth transistor is conducted, the fourth transistor is switched off, the sixth transistor is conducted, the seventh transistor is switched off, the control pole of the sixth transistor and the control pole of the seventh transistor are connected to the ground; and the first pole of the sixth transistor inputs the high voltage level signal to the control terminal of the switching control unit to control the switching control unit to be switched off.

8. The pixel driving circuit according to claim 6, wherein when the first voltage comparison unit outputs the low voltage level signal, the fifth transistor is switched off, the fourth transistor is conducted;

the first pole of the fourth transistor inputs the high voltage level signal to the control pole of the sixth transistor and to the control pole of the seventh transistor, such that the seventh transistor is conducted, and the sixth transistor is switched off; and the control end of the switching unit is connected to the ground through the seventh transistor to control the switching unit to be conducted.

9. A display panel, comprising a light-emitting unit and a pixel driving circuit;

wherein pixel driving circuit comprises a switching transistor, an energy storage capacitor, and a driving transistor, wherein a first pole of the switching transistor is configured to allow a data voltage to be input to the switching transistor, a second pole of the switching transistor is connected to the energy storage capacitor; a first pole of the driving transistor is configured to allow a power supply voltage to be input to the driving transistor, a second pole of the driving transistor is connected to a light-emitting unit, a control pole of the driving transistor is connected to the energy storage capacitor; and when the energy storage capacitor discharges to the control pole of the driving transistor, the driving transistor outputs a driving current to the light-emitting unit;

the control module further comprises a control module;

wherein the control module is connected in series with the driving transistor, the control module has a detection end, the detection end of the control module is connected to the light-emitting unit to detect a value of the driving current; and when the value of the driving current exceeds a preset current range, the control module is disconnected to allow the driving transistor to stop outputting the driving current to the light-emitting unit;

the control module comprises: a sampling resistor, a switching unit, and a first voltage comparison unit;

wherein the sampling resistor is connected in parallel with the light-emitting unit;

a first end of the switching unit is configured to allow the power supply voltage to be input to the switching unit, and a second end of the switching unit is connected to the first pole of the driving transistor; and a first input end of the first voltage comparison unit is connected to the light-emitting unit, a second input end of the first voltage comparison unit is configured to allow a reference voltage to be input to the first voltage comparison unit, an output end of the first voltage comparison unit is connected to a control end of the switching unit when a voltage of the light-emitting unit is greater than the reference voltage, the first voltage comparison unit outputs a high voltage level signal to control the switching unit to be switched off; or the control module comprises: a sampling resistor, a switching unit, and a second voltage comparison unit;

the sampling resistor is connected in parallel with the light-emitting unit;

a first end of the switching unit is configured to allow the power supply voltage to be input to the switching unit, a second end of the switching unit is connected to the first pole of the driving transistor;

a first input end of the second voltage comparison unit is connected to the ground, a second input end of the second voltage comparison unit is connected to the light-emitting unit, an output end of the second voltage comparison unit is connected to a control end of the switching unit; and when a voltage of the light-emitting unit is less than a voltage of the ground, the second voltage comparison unit outputs a high voltage level signal to control the switching unit to be switched off.

10. The display panel according to claim 9, wherein the first voltage comparison unit comprises: a first diode and a first voltage comparator, the switching unit comprises a first transistor, and the first transistor is a P-type transistor;

an anode of the first diode is connected to the light-emitting unit, a cathode of the first diode is connected to an in-phase input end of the first voltage comparator, an invert-phase input end of the first voltage comparator is configured to allow the reference voltage to be input to the first voltage comparator, an output end of the first voltage comparator is connected to a control end of the switching unit; and a first pole of the first transistor is configured to allow the power supply voltage to be input to the first transistor, a second pole of the first transistor is connected to the first pole of the driving transistor.

11. The display panel according to claim 9, wherein the control module further comprises a control unit;

a first end of the control unit is configured to allow the high voltage level signal to be input to the control unit, a second end of the control unit is connected to the ground, an input end of the control unit is connected to the output end of the first voltage comparison unit, an output end of the control unit is connected to the control end of the switching unit;

when the first voltage comparison unit outputs the high voltage level signal, the control unit outputs the high voltage level signal to the control end of the switching unit; and when the first voltage comparison unit outputs a low voltage level signal, the control unit outputs the low voltage level signal to the control end of the switching unit.

12. The display panel according to claim 11, wherein the control unit comprises: a second transistor and a third transistor; the second transistor Q2 is an N-type transistor, and the third transistor Q3 is a P-type transistor;

a first pole of the second transistor is configured to allow the high voltage level signal to be input to the second transistor, a second pole of the second transistor and a first pole of the third transistor Q3 are connected to the control end of the switching unit, a second pole of the third transistor is connected to the ground; and a control pole of the second transistor and a control pole of the third transistor are connected to the output end of the first voltage comparison unit.

13. The display panel according to claim 11, wherein the control unit comprises: a fourth transistor, a fifth transistor, a sixth transistor, and a seventh transistor; the fourth transistor and the sixth transistor are P-type transistors, and the fifth transistor and the seventh transistor are N-type transistors;

a first pole plate of the fourth transistor is configured to allow the high voltage level signal to be input to the fourth transistor, a first pole plate of the sixth transistor is configured to allow the high voltage level signal to be input to the sixth transistor; a second pole of the fourth transistor, a first pole of the fifth transistor, a control pole of the sixth transistor, and a control pole of the seventh transistor are connected to a same node; a second pole of the sixth transistor and a first pole of the seventh transistor are connected to the control end of the switching unit; a second pole of the fifth transistor and a second pole of the seventh transistor are connected to the ground; and a control pole of the fourth transistor and a control pole of the fifth transistor are connected to the output end of the first voltage comparison unit.

14. The display panel according to claim 9, wherein the second voltage comparison unit comprises: a second diode and a second voltage comparator;

a cathode of the second diode is connected to the light-emitting unit, an anode of the second diode is connected to an invert-phase input end of the second voltage comparator; an in-phase input end of the second voltage comparator is connected to the ground, and an output end of the second voltage comparator is connected to the control end of the switching unit.

15. A pixel driving circuit, comprising: a switching transistor, an energy storage capacitor, and a driving transistor, wherein a first pole of the switching transistor is configured to allow a data voltage to be input to the switching transistor, a second pole of the switching transistor is connected to the energy storage capacitor; a first pole of the driving transistor is configured to allow a power supply voltage to be input to the driving transistor, a second pole of the driving transistor is connected to a light-emitting unit, a control pole of the driving transistor is connected to the energy storage capacitor; and when the energy storage capacitor discharges to the control pole of the driving transistor, the driving transistor outputs a driving current to the light-emitting unit;

the pixel driving circuit further comprises a control module;

wherein the control module is connected in series with the driving transistor, the control module has a detection end, the detection end of the control module is connected to the light-emitting unit to detect a value of the driving current; and when the value of the driving current exceeds a preset current range, the control module is disconnected to allow the driving transistor to stop outputting the driving current to the light-emitting unit;

the control module comprises: a sampling resistor, a switching unit, and a second voltage comparison unit;

the sampling resistor is connected in parallel with the light-emitting unit;

a first end of the switching unit is configured to allow the power supply voltage to be input to the switching unit, a second end of the switching unit is connected to the first pole of the driving transistor;

a first input end of the second voltage comparison unit is connected to the ground, a second input end of the second voltage comparison unit is connected to the light-emitting unit, an output end of the second voltage comparison unit is connected to a control end of the switching unit; and when a voltage of the light-emitting unit is less than a voltage of the ground, the second voltage comparison unit outputs a high voltage level signal to control the switching unit to be switched off.

16. The pixel driving circuit according to claim 15, wherein the second voltage comparison unit comprises: a second diode and a second voltage comparator;

a cathode of the second diode is connected to the light-emitting unit, an anode of the second diode is connected to an invert-phase input end of the second voltage comparator; an in-phase input end of the second voltage comparator is connected to the ground, and an output end of the second voltage comparator is connected to the control end of the switching unit.

17. The pixel driving circuit according to claim 15, wherein the control module further comprises: a first voltage comparison unit and an or-gate circuit;

a first input end of the first voltage comparison unit is connected to the light-emitting unit, a second input end of the first voltage comparison unit is configured to allow a reference voltage to be input to the first voltage comparison unit, an output end of the first voltage comparison unit is connected to a first input end of the or-gate circuit;

an output end of the second voltage comparison unit is connected to a second input end of the or-gate circuit, an output end of the or-gate circuit is connected to the control end of the switching unit; and when the high voltage level signal is input to at least one of the first input end and the second input end of the or-gate circuit, the output end of the or-gate circuit outputs the high voltage level signal.

* * * * *